Figure 1:
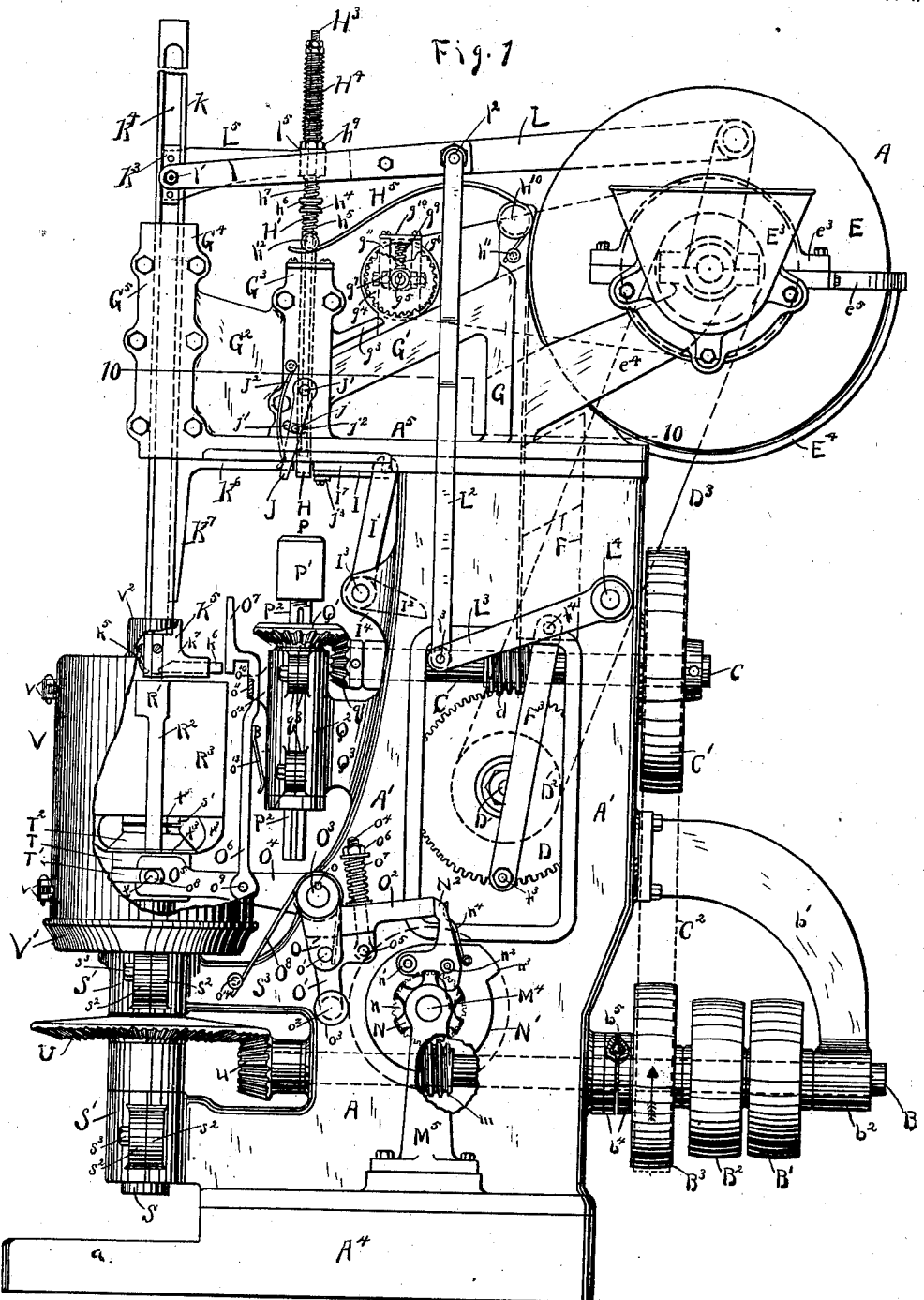

No. 686,122. Patented Nov. 5, 1901.
G. W. PACKER.
BOLT THREADING MACHINE.
(Application filed Aug. 2, 1900.)

(No Model.) 8 Sheets—Sheet 4.

Witnesses Inventor
George W. Packer
By Attys.

No. 686,122. Patented Nov. 5, 1901.
G. W. PACKER.
BOLT THREADING MACHINE.
(Application filed Aug. 2, 1900.)
(No Model.) 8 Sheets—Sheet 5.

Witnesses
Inventor
George W. Packer,
By
Atty's

No. 686,122. Patented Nov. 5, 1901.
G. W. PACKER.
BOLT THREADING MACHINE.
(Application filed Aug. 2, 1900.)
(No Model.) 8 Sheets—Sheet 6.
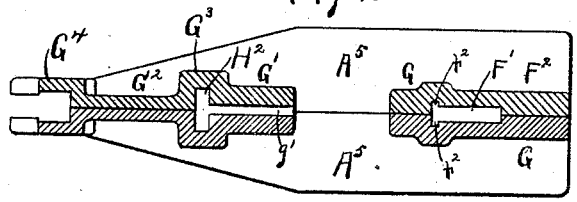
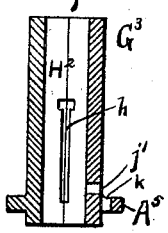
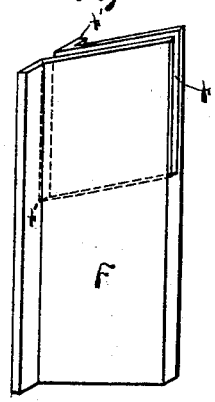
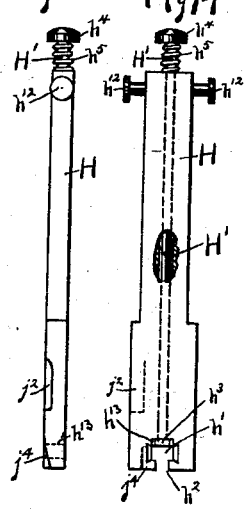
Witnesses
Inventor
George W. Packer
By Attys.

No. 686,122. Patented Nov. 5, 1901.
G. W. PACKER.
BOLT THREADING MACHINE.
(Application filed Aug. 2, 1900.)
(No Model.) 8 Sheets—Sheet 7.
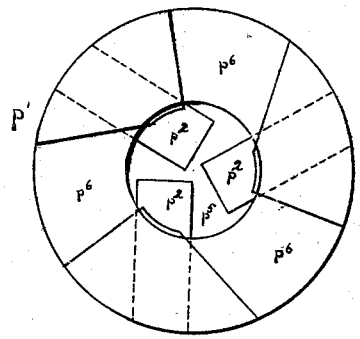
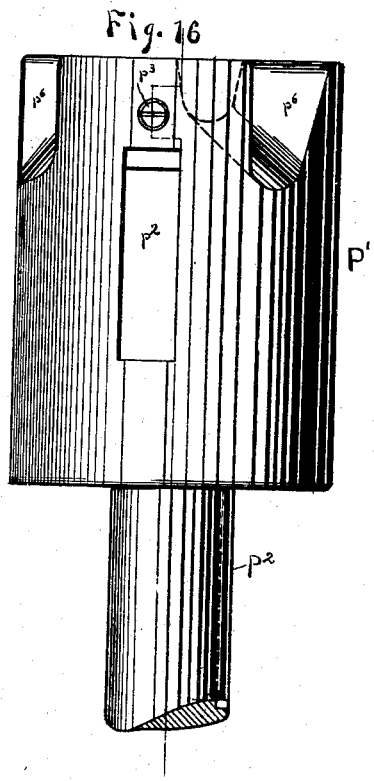
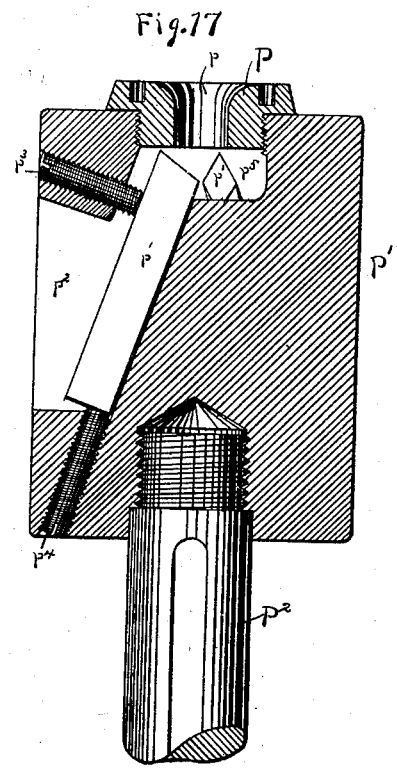
Witnesses
Oscar W. Bond
Belle W. Barry
Inventor
George W. Packer.
By Banning & Banning
Attys No. 686,122. Patented Nov. 5, 1901.
G. W. PACKER.
BOLT THREADING MACHINE.
(Application filed Aug. 2, 1900.)
(No Model.) 8 Sheets—Sheet 8.
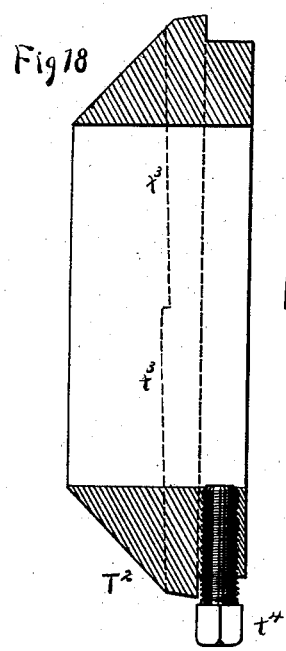
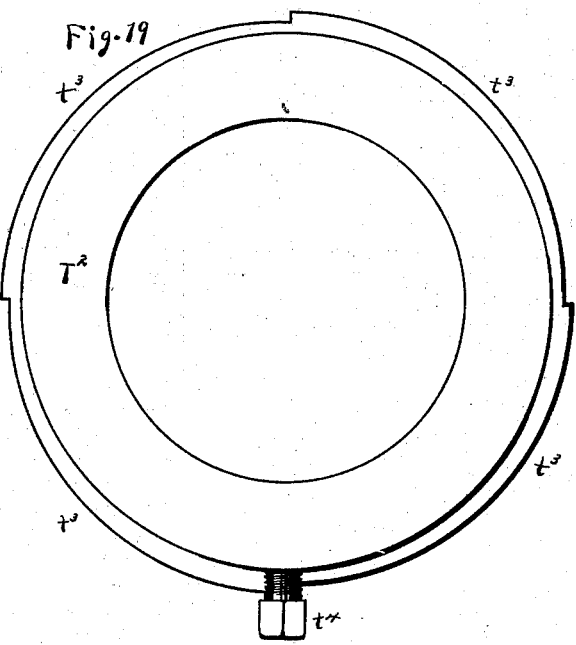
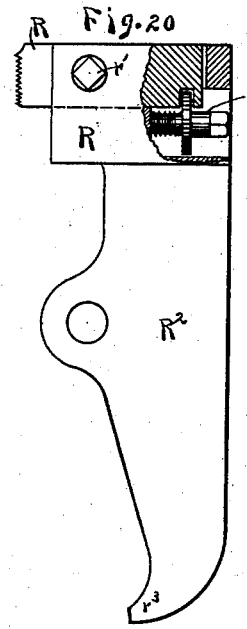
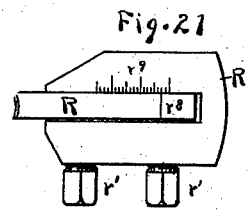
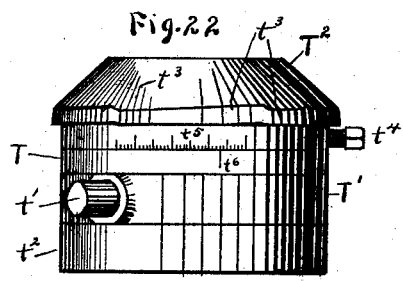
Witnesses
Oscar W. Mound
Belle W. Barry
Inventor
George W. Packer
By Banning & Banning
Atty's.

UNITED STATES PATENT OFFICE.

GEORGE W. PACKER, OF CHICAGO, ILLINOIS, ASSIGNOR TO THE DEERING HARVESTER COMPANY, OF CHICAGO, ILLINOIS.

BOLT-THREADING MACHINE.

SPECIFICATION forming part of Letters Patent No. 686,122, dated November 5, 1901.

Application filed August 2, 1900. Serial No. 25,637. (No model.)

*To all whom it may concern:*

Be it known that I, GEORGE W. PACKER, a citizen of the United States, and a resident of Chicago, in the county of Cook and State of Illinois, have invented certain new and useful Improvements in Bolt-Threading Machines, of which the following is a specification.

The invention relates to bolt-threading machines in which the bolt-blanks are received in an unpointed and unthreaded condition and delivered from the machine fully pointed and threaded.

The objects of the invention are to have the operations of pointing and threading the blanks after delivery to the machine automatically performed by the employment of mechanism which automatically delivers the bolt from the receiving-hopper to the end pointing or rounding die or tool, mechanism which automatically delivers the blank after pointing to the die for cutting the thread on the stem-blank, and mechanism which automatically discharges the pointed and threaded bolt after the operation of threading; to insure the feeding of the bolt from the hopper to the end pointing or rounding die and from the end pointing or rounding die to the threading-die; to time the parts in such relation one to the other that the operation of the machine will be continuous after the first bolt has been threaded and discharged; to retard the feeding of the bolt-blanks during the operation of the threading of the bolt and have the feeding automatically start with the discharge of a threaded bolt; to feed the bolt-blank to the end pointing or rounding die, raise the blank after pointing or rounding the end, force the end pointed or rounded blank from the feeding or carrying plunger, and feed the end pointed or rounded blank to the threading cutter or die; to adjust the parts for operating on bolt-blanks of different lengths and regulate the threading cutter or die in performing its work; to adjust and regulate the threading cutter or die as it becomes worn for operating on bolts of different sizes and lengths; to regulate the opening and closing of the threading cutter or die as required; to prevent injury to the parts in the event of a failure to discharge a threaded bolt or in case of a stoppage from other cause, and to improve generally the construction and operation of the several devices and appliances which enter into the construction and operation of the mechanisms and machine as a whole.

The invention consists in the features of construction and combination of parts hereinafter described and claimed.

Figure 2:
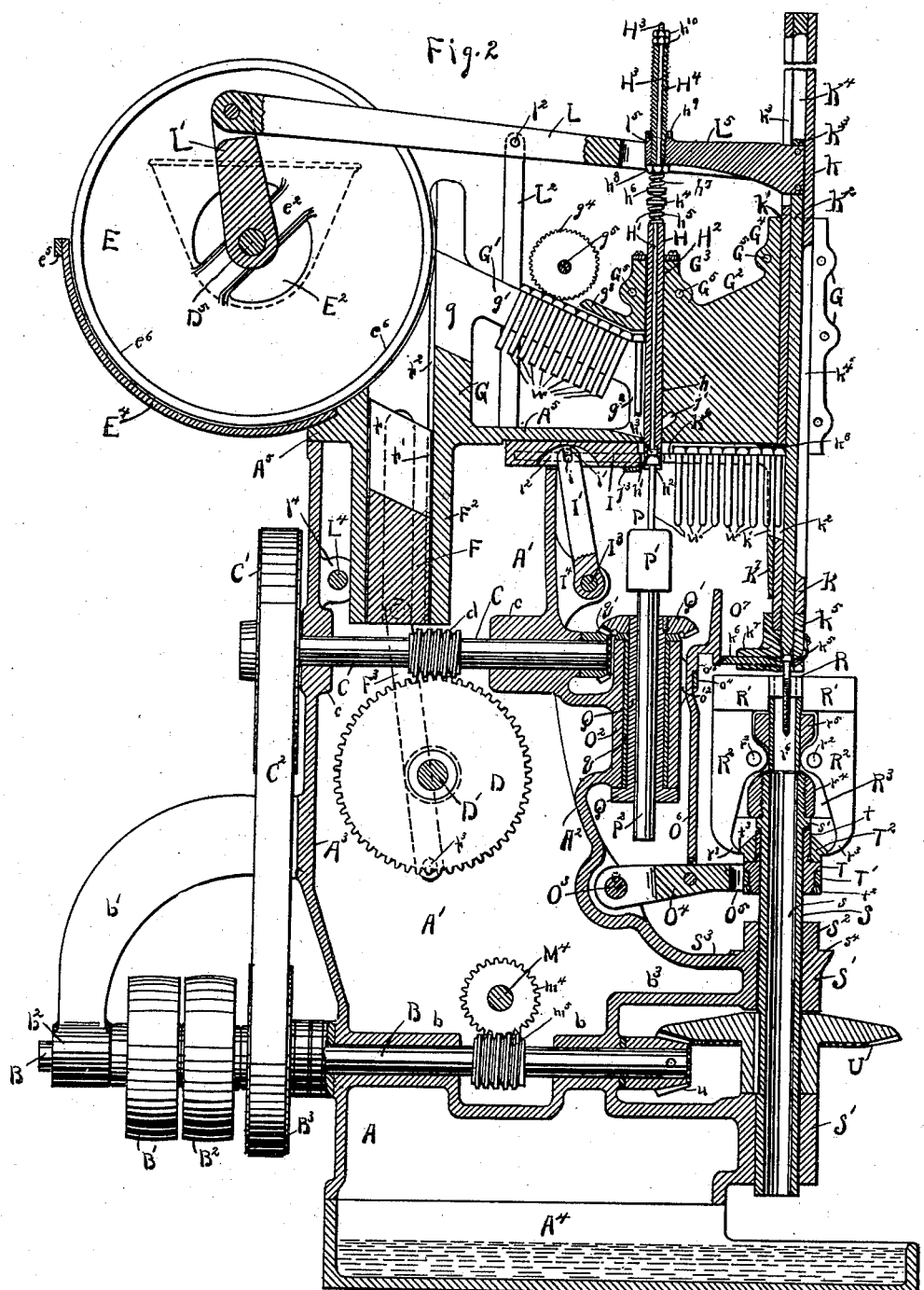
Figure 3:
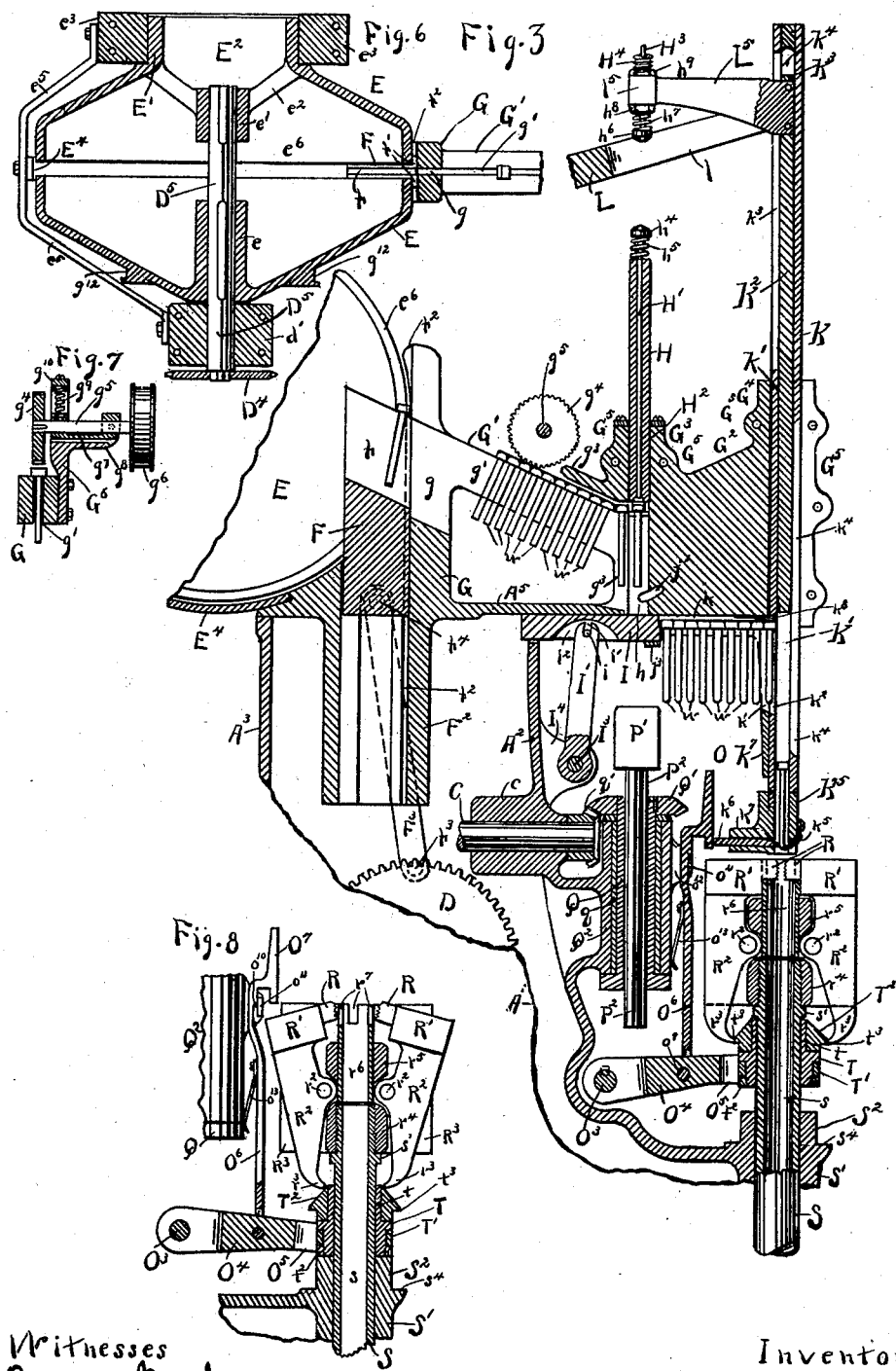
Figure 4:
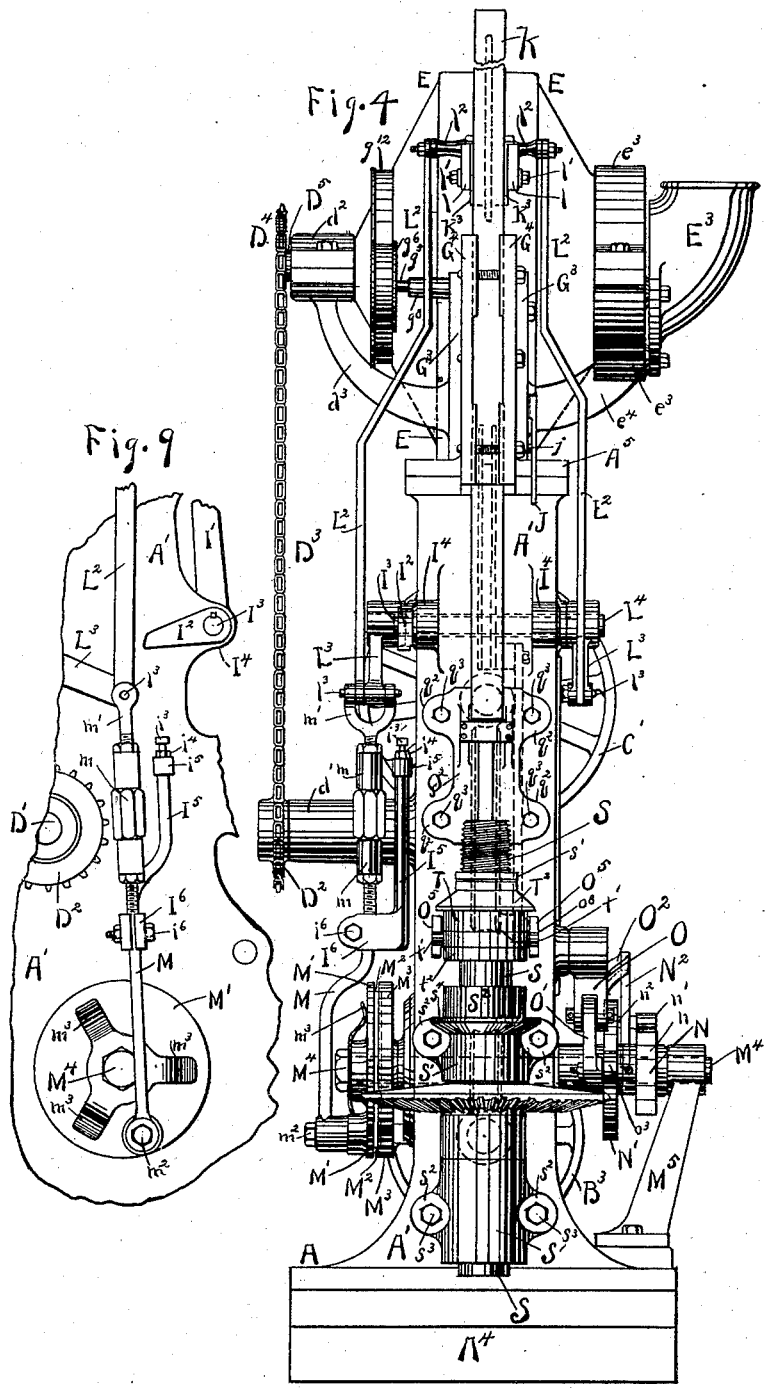
Figure 5:
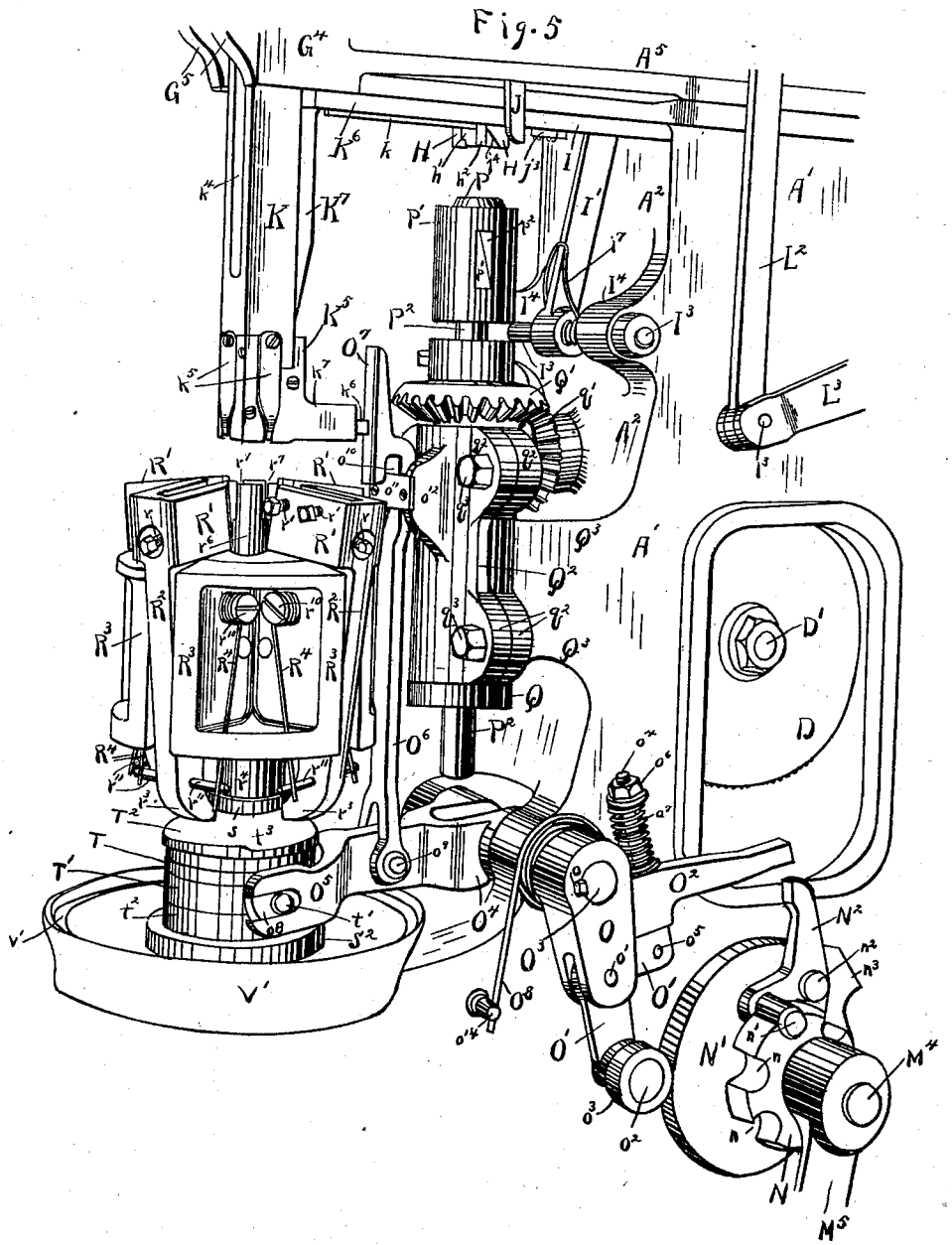

In the drawings illustrating the invention, Figure 1 is an elevation of one side of the machine with the casing around the threading cutter or die and its chuck and operating parts partly broken away; Fig. 2, a vertical sectional elevation central of the machine, showing the parts in position for end pointing or rounding a bolt-blank and for threading the end pointed or rounded bolt-blank; Fig. 3, a vertical sectional elevation central of the machine, showing a portion of the machine with the parts in position to feed a bolt-blank to the end pointing or rounding cutter or die and with an end pointed or rounded bolt-blank dropped into position to be operated upon by the threading cutter or die; Fig. 4, an elevation showing the front or bolt-threading side of the machine with the threading cutter or die removed; Fig. 5, a perspective view, on an enlarged scale, showing the threading cutter or die and the devices which coöperate therewith with the arms of the threading cutter or die chuck open for the discharge of a threaded bolt; Fig. 6, a horizontal section of the hopper in which the bolt-blanks are delivered looking down thereon; Fig. 7, a detail in section of the feeding-wheel for assisting the travel of the bolt-blanks from the hopper to the point of discharge to enter the end pointing or rounding tool or die; Fig. 8, a detail in section of the threading cutter or die and its chuck, showing a portion of the opening and closing devices for the chuck; Fig. 9, a detail in elevation, showing the crank-wheel and pitman which operate the lever of the plunger for feeding the bolt-blank to the end pointing or rounding chuck and the plunger for entering the end pointed or rounded bolt-blank into the thread-cutting chuck; Fig. 10, a plan view, partly in section, taken on line 10 10 of Fig. 1, showing the support or guide of the plunger for lifting and discharging the blanks from the hopper, the support or guide of the plunger for feeding the bolt-blanks to the end-pointing chuck, and the support or guide for the plunger which forces the end-pointing bolt-blanks into the thread-cutting chuck; Fig. 11, a perspective view of the plunger for lifting or raising the bolt-blanks in and discharging the bolt-blanks from the feeding-hopper; Fig. 12, a sectional elevation of the support or guide for the plunger which feeds the bolt-blank to the end pointing or rounding chuck; Fig. 13, an edge elevation of the plunger for feeding the bolt-blanks to the end pointing or rounding chuck;
Fig. 14, a side elevation of the plunger shown in Fig. 13; Fig. 15, an enlarged end elevation or plan view of the end pointing or rounding chuck and its cutters or die; Fig. 16, an enlarged side elevation of the end pointing or rounding chuck and its cutters or die; Fig. 17, an enlarged sectional elevation of the end pointing or rounding chuck and its cutters or die with the shaft therefor in elevation; Fig. 18, a cross-section of the closing and adjusting cam-ring for the jaws or arms of the thread-cutting chuck; Fig. 19, a top or plan view of the closing and adjusting cam-ring shown in Fig. 18; Fig. 20, an elevation, partly in section, of one of the jaws or arms of the thread-cutting chuck; Fig. 21, an end or plan view of one jaw or arm of the thread-cutting chuck, and Fig. 22 an elevation of the closing and adjusting cam-ring and its sliding head or support for the jaws or arms of the thread-cutting chuck. Figs. 18 to 22, both inclusive, are enlarged.

The several mechanisms and parts which enter into the construction of the machine are mounted on a hollow base or support A, having formed therewith in the arrangement shown a hollow pedestal or standard consisting of side plates or walls A', a front plate or wall A², and a rear plate or wall A³ for carrying the several mechanisms and parts, as hereinafter described, and the base or pedestal as a whole in the construction shown is mounted or supported on a secondary base A⁴, which forms a receptacle for the oil and cuttings from the cutters or dies.
The base A has mounted thereon a driving-shaft B, which, as shown, is supported in boxes or bearings $b$, formed with the base, and in an outer box or bearing $b^2$ on a bracket or arm $b'$, bolted or otherwise secured to the rear plate A³, and extending from the box or bearing $b$ at one end is a casing $b^3$, formed with the front plate or wall of the base. The driving-shaft B has mounted thereon a loose pulley B' and a fast pulley B² and also has fixed thereon a driving-pulley B³. A counter-shaft C is mounted in suitable bearings or boxes $c$ and $c'$ on the front and rear plates of the pedestal or standard, as shown in Fig. 2, and this shaft has on its outer projecting end a pulley-wheel C', over which and the pulley-wheel B³ a driving-belt C² runs or travels for imparting rotation to the counter-shaft C from the main driving-shaft. The counter-shaft has thereon a worm-gear $d$, which meshes with a gear D on a shaft D', mounted in suitable bearings or boxes on the side plates A' of the frame and located below the counter-shaft C in the arrangement shown, so that with the rotation of the counter-shaft the gear will be driven, driving the shaft D'. The shaft D' at one end extends beyond its bearing or box $d'$ and has thereon a sprocket-wheel D² for driving a sprocket-chain D³, running over a sprocket-wheel D⁴ on the end of a shaft D⁵ for driving the shaft. The shaft D⁵ at one end is mounted in a journal box or bearing $d^2$, carried by a bracket or support $d^3$, extending up from a cap-plate A⁵, attached to the top of the pedestal or standard. The shaft D⁵ has secured thereto a hopper E of an annular formation and made in two divisions or sections, each division or section having its end tapered or inclined and one section or division having a hub $e$ for attachment to the shaft by a suitable key and groove, and the other section having a hub $e'$ for attachment to the shaft by a suitable key and groove, which hub $e'$ is carried by arms $e^2$, forming a spider connecting the hub with an annular rim or ring E', leaving a mouth or opening E² for feeding the bolt-blanks into the interior of the revolving annular hopper E. The rim or ring E' is mounted in a journal box or bearing $e^3$ on the end of an arm $e^4$, extending up from the cap-plate A⁵, so that the hopper is free to be revolved by the revolving of the shaft D⁵ from its sprocket-wheel D⁴. The journal box or bearing $e^3$ has secured to its lower-half section a feeding-spout E³, into which the bolt-blanks are delivered to be discharged into the interior of the hopper through the feed mouth or opening E², with which the feeding-spout E³ communicates. The two sections or divisions of the revolving annular hopper are separated, so as to leave a central slot or opening $e^6$, which slot or opening on the under portion at one side is covered or closed by a plate E⁴, attached at one end to the cap-plate A⁵ and supported at its upper or free end by a bar $e^5$, attached to the lower sections of the journal boxes or bearings $d^2$ and $d^3$, as shown in Figs. 1, 2, and 7. This cap or cover E⁴ prevents the stems of the bolt-blanks from falling down through the slot with the revolutions of the hopper.

A plunger or slide F is located in line with the slot between the sections of the hopper, so that it can be projected through the slot into the hopper. This plunger or slide at its upper end is formed with a slot or opening $f$, and has on each side guide flanges or ribs $f'$, which fit into grooves $f^2$ in a guide or support F², having an opening F' for the plunger or slide to reciprocate therein. The guide or support F² depends from the cap-plate A⁵, so as to locate the plunger or slide F in line with the open space $e^6$ between the sections or divisions of the hopper for the upper end of the plunger or slide to be projected upward into the hopper and engage a bolt-blank to have the stem thereof drop into the opening or slot $f$, with the head of the bolt-blank resting on the end of the plunger or slide, which end has a downward and outward inclination by which the caught bolt-blank will slide down on the plunger, as shown in Fig. 3. The plunger or slide F is reciprocated from the rotation of the gear D by a pitman or rod $F^3$, having one end connected to a wrist-pin or pivot $f^3$ on the gear and the other end connected to a pin or pivot $f^4$ on the plunger or slide.

A guide or support G extends up from the cap-plate $A^5$, which cap-plate is made in two halves or sections, and the parts which are formed therewith are also divided into two parts or sections. The guide or support G has therein a continuation of the opening or way F' for the plunger or slide F, and at its upper end is provided with a slot or opening $g$ in line with the slot $f$ of the plunger or slide when elevated, so that a bolt-blank can slide down the inclined end of the plunger or slide and pass into the slot or opening $g$. An inclined guide or support G' extends from the guide or support G and has therein an opening or slot $g'$, into which the stems of the bolt-blanks pass as the blanks slide down on the incline G'. The inclination of the support or incline G' is sufficient to cause the bolts to slide down naturally; but as a blank might stick or fail to feed forward from some cause additional feeding means may be necessary, and such additional feed is furnished in the construction shown by a corrugated disk or wheel $g^4$, mounted on a shaft $g^5$, having on the opposite end thereof to the fluted or corrugated disk a pulley-wheel $g^6$, by which the shaft can be rotated through a belt driven from a wheel-flange $g^{12}$ on the hopper or in any other suitable manner. The shaft $g^5$ is mounted in a yielding or movable box or bearing $g^7$, pivoted at one end to a fixed support $g^8$, extending out from an arm or bracket $G^6$, bolted or otherwise secured to the guide or standard G', as shown in Fig. 7. The movable box or bearing $g^7$ is held down at one end, so as to have a yielding movement, by a coil-spring $g^9$, one end of which engages the box or bearing and the other end engages a cross-piece $g^{10}$ on the end of the side pieces $g^{11}$, between which the movable end of the box or bearing is located. The fluted or corrugated disk engages the heads of the bolt-blanks, as shown in Fig. 3, and by its rotation assists in feeding the blanks forward, and the yielding bearing allows the wheel or disk to conform to any irregularities in the heads, thereby riding freely in contact with the heads and insuring the positive feeding forward of the blanks. The blanks leave the slot or opening $g'$ and hang suspended from their heads in a slot or opening $g^2$ at the end of the inclined side pieces or guides G', which opening or slot is in a vertical post or standard $G^3$ on a support or wall $G^2$, extending up from the cap-plate $A^5$, and from which the bolt-blanks are successively advanced into a slot or opening $h$, also in the vertical post or standard $G^3$ on the support or wall $G^2$, for their heads to be caught and held in a feeding-plunger.

The feeding-plunger H slides in an opening or passage $H^2$, formed therefor in the vertical post or standard $G^3$ on the head or wall $G^2$. The lower end of the plunger has therein a cross slot or opening $h'$, which when the plunger is raised is in line with the head of a bolt-blank suspended in the slot or opening $g^2$, and extending from the opening $h'$ through the end of the plunger is a slot or mouth $H^2$, into which the stem of the bolt-blank passes as the head of the blank enters the slot or opening $h$, so that the bolt-blank hangs suspended from the plunger, with its head sustained in the opening $h'$ and its stem extending through the slot or mouth $h^2$ down into the slot or opening $h'$, as shown in Fig. 3. The plunger H carries a sliding rod or stem H', having at its end a head $h^3$ to engage the head of the bolt and hold the bolt-blank perfectly straight or perpendicular. The upper end of the rod or stem H' has thereon a head $h^4$, between which and the end plunger H is a coil-spring $h^5$, which retracts and holds retracted the rod or stem H', with its head clear of the slot or opening $h'$, so that the head of a bolt-blank is free to be pushed into the opening $h'$ of the plunger.

The plunger H is forced down after a bolt-blank has been caught thereby through a sliding contact rod or stem $H^3$, carried in a screw-threaded sleeve or tube $H^4$. The contact rod or stem $H^3$ has on its end a head $h^6$ to engage with the head $h^4$, and around the rod is a coil-spring $h^7$, one end of which abuts against the head $h^6$ and the other end of which engages with a movable collar or ring $h^8$ around the stem. The rod or stem $H^3$ is adjusted, so as to have the proper contact between the heads $h^4$ and $h^6$, by lock adjusting-nuts $h^{10}$, and the sleeve or tube $H^4$ is held when inserted in its carrying-arm by a lock-nut $h^9$. The downward movement of the sliding contact rod or stem $H^3$ engages the contact-heads $h^4$ and $h^6$ and forces the plunger H down, carrying with it the caught bolt-blank for a purpose hereinafter described. The initial engagement of the contacts $h^4$ and $h^6$ operates to force the rod or stem H' down for its head $h^3$ to engage the head of the bolt-blank and hold the blank in a straight vertical plane to be operated upon, and in order to prevent the next succeeding bolt-blank after the caught one from interfering with the downward thrust of the plunger H in case the next succeeding bolt-blank is pushed inward where its head would be contacted by the end of the plunger the plunger end on the side adjacent to the feeding slot or opening and on one side of the end slot or opening is cut away, forming an incline which engages the head of the next succeeding bolt-blank and forces such blank backward and out of the way of the plunger. The bolt-blank after being operated upon and pointed or rounded at its end, as hereinafter described, is to be removed from the plunger H for the operation of threading. The plunger is forced down under the resistance of a spring $H^5$, one end of which is coiled around a stud or pin $h^{10}$ and engages with a stud or pin $h^{11}$, both on the upward extension of the standard or upright G, and the front end of the spring engages with studs or pins $h^{12}$ on the upper end of the plunger H. The downward movement of the plunger places the spring $H^5$ under a tension, so that with the return movement of the rod or stem $H^3$ the spring will act to return the plunger H, and such return is intermittent and stops at a point to bring the slot or opening $h'$ and $h^2$ in line with a slot or opening $k$, into which the head and stem of the bolt-blank is passed. The discharge of the bolt-blank from the plunger H for its head to pass into the slot or opening $k$ is by means of the ejector or discharger I, which reciprocates in ways on a support or arm $I^7$, extending out from the main pedestal or standard of the machine. The acting end of the ejector or discharger I is of a thickness corresponding to the width of the seat or mouth $h^2$ and of a depth and length to enter and pass through the slot or opening $h'$ and $h^2$ a sufficient distance to force the bolt-blank therefrom to enter the passage or slot $k$.

The ejector or discharger is reciprocated by means of an arm or lever $I'$, having at its upper end a slot $i'$, which engages with a pin $i$ on the ejector or discharger, and the body of the ejector or discharger is cut away so as to leave a semicircular recess $i^2$, in which the end of the arm or lever moves. The arm or lever $I'$ is mounted on a rock-shaft $I^3$, supported in ears $I^4$, extending out from the front plate $A^2$ of the pedestal or standard, and this rock-shaft has secured thereto at one end an arm or lever $I^2$, arranged to be engaged by an adjustable contact or head $i^3$ and raised thereby. The contact or head $i^3$, as shown, has a screw-threaded stem which enters a screw-threaded nut or socket $i^4$ in a ring or band $i^5$ on a tube or rod $I^5$, carried by a clamp $I^6$, attached by bolts $i^6$ to a reciprocating pitman or rod. The construction of the contact or head $i^3$ is one which enables the point of engagement with the arm or lever $I^2$ to be adjusted and changed as required to give the proper throw to the ejector or discharger for forcing the bolt-blank from the plunger H into the receiving passage or slot $k$, to be advanced by the succeeding bolt-blanks until the point of discharge is reached.

The plunger H, with the pointed or end-rounded bolt-blank caught therein, must be positively stopped at a point for its slot or opening $h'$ and $h^2$ to be in direct line with the slot or passage $k$ into which the bolt-blank is to be forced. This result is secured by means of an oscillating or swinging arm J, mounted on a pin or stud $J'$, extending out from the upright or post $G^3$. This swinging or oscillating arm carries a pin $j$, which projects through a curved slot $j'$ in the side of the post or upright $G^3$ to engage with a notch or recess $j^2$ in the body of the plunger H, which notch or recess is located at the proper point to stop the plunger, so as to bring the slot or opening in its end in line with the receiving slot or passage into which the pointed or end-rounded bolt-blank is to be discharged. The oscillating or swinging arm is engaged by the free end of a spring $J^2$, attached to the side of the post or upright $G^3$ and operating to force the pin $j$ against the body of the plunger, so as to cause the pin to positively enter the notch or recess $j^2$ when the plunger reaches a point in line with the pin. The pin is released from engagement with the notch or recess by the advance of the ejector or discharger, for which purpose the ejector or discharger has attached to its forward end a contact arm or plate $j^3$, which strikes the end of the swinging or oscillating arm J and moves such arm outward or away from the plunger, disengaging the pin from the notch or recess, leaving the plunger free to be returned to its normal position by the action of the return-spring $H^5$ and bringing the parts into position for the next bolt to pass into the opening of the plunger. The notch or recess $j^2$ is of a form to not interfere with the descent of the plunger, having for this a curved back wall opening out to the edge of the plunger.

The bolt-blanks are forced forward in the horizontal slot or passage $k$, which slot or passage is formed in a plate $K^6$, having a depending portion $K^7$, in which is an opening $k'$ of sufficient length for the bolt-blank to hang suspended therein, with its head caught or held in the slot or passage $k$, as shown in Fig. 1, and, as shown, the advance bolt-blank has its head engaged by a pressure-spring $k^3$, which acts to retain the blank from being pushed forward too rapidly. The advance bolt-blank is forced from the carrying slot or passage after the slot or passage has been filled with pointed or end-rounded bolt-blanks by the action of the next blank as it is forced from the plunger by the ejector or discharger, and this advance blank will pass through a slot or opening $k^2$ and enter a vertical passage or opening $K'$, down which it falls by gravity into the position shown by the entered blank in Fig. 3. The passage or opening $K'$ is in a vertical guide or support K, and operating in the passage or opening $K'$ is a plunger $K^2$, the end of which with the descent of the plunger engages the head of the dropped bolt-blank to force such blank downward against the resistance of the spring-stops $k^5$ in a head $K^5$ on the end of guide or support K for the end of the blank to enter the threading cutter or die. The guide or support K is secured in a post or upright $G^4$ on the wall or post $G^2$, and this support or upright $G^4$ and the post or upright $G^3$ each have ears $G^5$, through which bolts pass for securing the two halves or sections of the cap-plate and the parts mounted thereon together.

The upper end of the plunger $K^2$ has thereon slide pieces or heads $K^3$, which project through openings $K^4$ in the guide or support. The rear wall of the guide or support has a vertical slot or opening $k^3$ for the movement of the arm carrying the sliding contact rod or stem $H^3$, and the front wall of the guide or support has a slot or opening $h^4$, which permits access to the plunger slot or opening for releasing a bolt-blank which by an improper discharge or other cause has become stuck in its descent. A rocking or oscillating arm or lever L is pivotally mounted at one end to a swinging support L' on the shaft $D^5$, and the free end of the lever has a fork $l$, which straddles or passes on each side of the guide or support K and is pivotally connected by suitable studs or pins $l'$ with the slides or heads $K^3$, so that the oscillating or rocking lever will reciprocate the plunger $K^2$ and operate the plunger to engage with and force downward the bolt-blank. The arm or lever is oscillated or rocked by links or bars $L^2$, pivotally connected at their upper end by suitable pins or pivots $l^2$ with the arm or lever and having their lower ends connected each with an arm or lever $L^3$ by a suitable pin or pivot $l^3$. The arms or levers $L^3$ are connected one to each end of a rock-shaft $L^4$, mounted in bearings or ears $l^4$ on the rear plate $A^3$ of the pedestal or standard, so that with the rocking movements of the shaft the links or bars will be reciprocated and raise and lower the lever L, giving a reciprocating movement to the plunger $K^2$. The rock-shaft is operated from a pitman or rod M, one end of which is connected by a fork or stirrup $m'$ with one of the links $L^2$ and one of the arms or levers $L^3$, and the fork or stirrup $m'$ is connected with the pitman or rod M by a turnbuckle $m$, so that the length can be adjusted to give the proper stroke for the movement of the arm or lever L to reciprocate the plunger $K^2$. The pitman or rod M has attached thereto by the clasp $I^6$ the contact rod or stem $I^5$, and the connection is below the turnbuckle, so that the adjustment of either the pitman or rod or the contact rod or stem will not interfere one with the other, permitting the pitman or rod to be lengthened or shortened by the turnbuckle without interfering with the adjustment of the contact rod or stem. The pitman or rod M is connected to a wrist-pin $m^2$ on a crank-disk M', which disk has a friction rim or ring $M^2$ to engage with a power-disk $M^3$, mounted on a shaft $M^4$, supported at one end in a suitable bearing or box on the side plate of the pedestal or standard and supported at its other end in a bearing or box on the end of a bracket or arm $M^5$, extending up from the base A, as shown in Fig. 4. The shaft $M^4$ has thereon a gear $m^4$, which is in mesh with a worm-gear $m^5$ on the shaft B, so that the revolving of the shaft B rotates the gear $m^4$ and revolves the shaft $M^4$, revolving therewith the power-disk $M^3$ to drive the friction-disk M' through the friction rim or ring $M^2$ and impart reciprocation to the pitman or rod M to oscillate or rock the lever L and reciprocate the plunger $K^2$.

The friction-disk M' is held in engagement by means of the spring-plate $m^3$, attached to the end of the shaft $M^4$, as shown in Figs. 4 and 9, and is arranged so as to be retarded when a resistance is encountered, owing to the disk slipping from the resistance giving a retarded or slow movement thereto and transmitting a corresponding slow movement to the connecting-rod M and through such rod to the parts operated therefrom, so that a retarded or slow movement will be given to the lever or arm L during the operation of the plunger in forcing the bolt-blank from the retaining springs or arms, and with the discharge of the bolt-blank the resistance is removed, allowing the friction-disk to revolve with the disk on the power-shaft, giving an increased movement in point of time to the connecting rod or part M and the parts and operated therefrom, by which the arm or lever L will be returned in less time than the time required in its descent and forcing the bolt-blank from the retainer. The result of the construction and operation of the friction-disk and the parts operated therefrom is to give a retarded or slow movement to the arm or lever L when forcing the bolt-blank from the retainer and a quick return movement to such arm or lever, which permits the operation of the parts in due and proper time in connection with the coacting parts of the machine for feeding the bolt-blanks from the receiving-hopper to the threading-dies.

The shaft $M^4$ has mounted thereon, adjacent to the bracket or standard $M^5$, a disk or wheel N, having a series of peripheral recesses or openings $n$, and adjacent to the disk or wheel N on the shaft $M^4$ is loosely mounted a disk N', having a cam or projecting end $n^3$, and mounted on the cam-disk N' by a pin or pivot $n^2$ is a catch or dog $N^2$, carrying a pin or stop $n'$, having thereon, as shown, a sleeve to engage with the notches or recesses $n$ in the disk or wheel N, so that when engaged the disk or wheel will rotate or revolve the cam-disk N', and when the dog or catch is disengaged the disk or wheel N is free to revolve without imparting rotation to the cam-disk N'. The dog or catch is forced into engagement and held engaged by a spring $n^4$ on the cam-disk and having its free end to contact the dog or catch.

The cam-disk N' coacts with a lever or arm O, attached by a key $o$ or otherwise to a shaft $O^3$, so that the shaft will be rocked with the engagement of the cam-disk to move the arm or lever. The arm or lever O has pivotally mounted in its end by a pin or pivot $o'$ an L or bell-crank lever O', one member of which has a pin $o^2$, on which is mounted a roller $o^3$ to run in contact with the periphery of the cam-disk N' and have the cam act, through the roller, to move the arms or levers O and O' and rock the shaft $O^3$. The arm or lever O has extending out therefrom a stop-arm $O^2$, arranged in line with a dog or catch $N^2$, so that when the lever O is moved out by the engagement of the cam $n^3$ the end of the stop-arm $O^2$ will be brought into line with the end of the dog or catch $N^2$ and act to raise the engaging end of the dog or latch from engagement with the notch or recess of the disk or wheel N, stopping the rotation of the cam-disk from the disk or wheel N and holding the roller $o^3$ out of contact with the periphery of the cam-disk.

The upper arm of the L or bell-crank lever O' has a stem or rod $o^4$ pivotally attached thereto by a pin or pivot $o^5$, and the rod or stem passes up through the stop-arm $O^2$ and at its end is screw-threaded to receive a nut $o^6$, between which and the face of the stop-arm is a coiled resistance-spring $o^7$. The stem acts through the resistance-spring to hold the L-lever O' in place under ordinary operating conditions of the parts, and at the same time a safety means is provided by the spring in case of a stoppage or a failure to properly operate the mechanism connected with the rock-shaft $O^3$, by means of which the chuck of the threading cutter or die is closed and which might produce a resistance that would cause injury to the parts. Such result is prevented by the coiled spring $o^7$, which yields and allows the L-lever to be moved by the action of the cam-disk without injurious effects, leaving the cam-disk free to revolve, with the cam non-acting so far as affecting the operation of the arm or lever O and its component parts is concerned. The arm or O is returned to its normal position after the cam $n^3$ has passed by a spring $O^8$, having its body coiled around the shaft $O^2$, for one end to engage with a stud or pin $o^{14}$ on the base of the machine and the other end to engage with the end of the arm and exert an outward force or pressure to return the roller to its normal position, as shown in Fig. 5.

The rock-shaft $O^3$ has attached thereto an arm or lever $O^4$, having a fork $O^5$ at its outer or free end, each arm of the fork having therein a slot $o^8$. A swinging arm or support $O^6$ is pivotally attached at its lower end to the arm or lever $O^4$ by a pin or pivot $o^9$ and extends upward, and at its upper end has a contact-head $O^7$, which is engaged by a slide-pin $k^6$, carried by a socket $k^7$, extending out from the head $K^5$, attached to the lower end of the tubular post or stem K. The sliding stem $k^6$ forms one of the stops for holding the bolt-blank against dropping through the vertical opening or passage K'. The remaining stops, as shown, are formed of springs $k^5$, the ends of which, as well as the end of the sliding stem $k^6$, project into the vertical passage or opening sufficient to stop the descent of the bolt-blank and at the same time permit a yield by which the blank can be forced through the stops and into the threading cutter or die by the operation of the plunger $K^3$. The arm or support $O^6$ has a shoulder $o^{10}$, which when the arm or support is raised into operative position engages with the edge of a cross-plate $o^{11}$, attached to the ears $o^{12}$, extending out from a bearing or journal-box $Q^2$, and, as shown, the arm or support is held in engagement with the plate $o^{10}$ by a spring $o^{13}$, attached to the arm or support and having its free end in engagement with the bearing or journal-box, as shown in Fig. 3.

The pointing or rounding of the end of the bolt-blanks is performed by a chuck or head having a continuous rotation and carrying a tool or die. The chuck or head shown has a guide or centering plate P, with an opening or mouth $p$, removably attached to a chuck or head P', so as to permit the guide or centering plate to be changed, as required for bolts of different diameters. The chuck or head P' carries a series of cutting chisels or blades $p'$, the cutting ends of which are adjusted adjacent to the lower face of the guide or centering-plate and around the mouth or opening $p$, as shown in Fig. 17. The cutting chisels or blades $p'$ are entered through openings $p^2$ in the chuck or head and are each adjusted endwise by a screw-threaded stem $p^4$ and are locked and held against outward movement when adjusted by a screw-thread stem $p^3$, as shown in Fig. 17, and, as shown in Figs. 15, 16, and 17, an opening or chamber $p^5$ is formed in the end of the chuck or head $k$ below the guide or centering plate, into which the cuttings drop and from which they are discharged through slots or openings $p^6$, having inclined bottoms, as shown in Fig. 16. The chuck or head is attached to a shaft P, revolved from a hollow shaft Q, in which the shaft $P^2$ is mounted. The hollow shaft Q has secured to one end a bevel-gear Q', which meshes with a bevel-pinion $q'$ on the end of the shaft C, so that the revolving of the shaft C revolves the pinion and rotates the bevel-gear to drive the hollow shaft. The hollow shaft, as shown, is mounted in a sleeve or bushing $q$ in a bearing or journal-box $Q^2$, carried by an arm $Q^3$, extending out from the front plate $A^2$ of the pedestal or standard, and the box or bearing $Q^2$ is made in halves, each half or section having ears $q^2$, by means of which and suitable bolts $q^3$ the two halves or sections are secured together.

The operation of the pointing or rounding chuck or head and its cutter is performed when the descent of the plunger H carries into the guide-plate a bolt-blank for the end to be acted on by the chisels or blades of the chuck or head, and during this operation the plunger is held in its descended position by the engagement of the two contact rods or stems H' and $H^3$, at which time the arm or lever L has been carried to the limit of its downward throw. The plunger H will be held in its descended position a sufficient length of time for the pointing or rounding of the blank end, and with the finish of the operation the plunger is released by the upward movement of the arm or lever L, permitting the spring $H^5$ to act and return the plunger, which return is limited by the engagement of the pin $j$ with the end shoulder of the notch or recess $j^2$ stopping the upward movement of the plunger at a point for the slot or opening $h'$ and $h^2$ therein to be in line with the receiving slot or passage $k$, at which time the ejector or discharger I is advanced for its acting end to enter the plunger slot or opening and force the pointed or end-rounded blank from the plunger into the slot or passage $k'$. The continued advance of the ejector or discharger releases the pin $j$ by moving the arm or lever J for the plunger to be returned to its normal position by the spring $H^5$, with its slot or opening $h'$ and $h^2$ in line with the slot or opening $g^3$ to receive a new bolt-blank thereinto. The new bolt-blank caught by the plunger is carried down thereby with the next downward movement of the arm or lever L and entered into the end pointing or rounding chuck or head, pointed or rounded at its end, and returned by the return of the plunger to be discharged by the operation of the ejector or discharger and have the plunger return to its normal position for the next bolt-blank in the manner described. These operations will continue so long as the blanks are fed into the plunger. The bolt-blanks after being rounded or pointed at the end are forced through the slot or passage $k$ into the descending passage or opening $K'$, to be forced therefrom into the thread-cutting chuck or head to be threaded. The thread-cutting chuck or head shown has four dies or cutters R, each carried in a head $R'$ and adjustable therein by a screw-threaded stem $r$ and locked when adjusted by set-screws $r'$. Each head $R'$ is carried on an arm $R^2$, pivoted at $r^2$ to a head or support $R^3$, and each arm has its lower end turned inward to form a contact-point $r^3$ to engage with the closing-cam. The jaws are thrown open after the bolt has been threaded by springs $R^4$, one for each jaw, each spring mounted on a leaf or plate of the carrying-head by a pin or stud $r^{10}$ and having its free end engaged with a pin or stud $r^{11}$ on the lower end of the jaw, as shown in Fig. 5. The head or support $R^3$ has a center or hub $r^4$ for attachment to the rotating shaft and a center or hub $r^5$, which carries a guide-tube $r^6$, the upper end of which has slots $r^7$ for the passage of the dies or cutters, as shown in Fig. 8, and into which the stem of the bolt as it is threaded projects.

The head or support $R^3$ has its hub or center $r^4$ screw-threaded onto the end of a hollow shaft S, the opening or bore $s$ of which is in line with the tube $r$, so that a threaded bolt when released from the dies or cutters will descend through the hollow shaft and pass into a receptacle or place of discharge, while the cuttings and the oil used in the threading operation will drop into the receptacle $A^4$, from which the cuttings and oil can be removed at the side $a$, which projects beyond the base A and is open on the top. The bolts can be deposited on an incline (not shown) to be discharged outside of the receptacle, leaving the cuttings and oil free to pass into the receptacle. The hollow shaft S is mounted in suitable bearings or journal-boxes $S'$, the upper one of which is on an arm or bracket $S^3$, extended out from the base, and the lower one of which is on the base, as shown in Fig. 1, and each bearing or journal-box is made in two halves or sections, each half or section having ears $s^2$, by means of which and bolts $s^3$ the two sections or halves are secured together. The hollow shaft S at its upper end has a flange $s'$ to limit the entering of the head or support $R^3$ thereon, and, as shown, the upper bearing or journal-box $S'$ has thereon a hub or extension $S^2$ for the support of the casing inclosing the threading chuck or head, which casing rests on the shoulder $s^4$, formed on the bearing or journal-box, as shown in Fig. 3.

The arms or jaws of the threading chuck or head are thrown open by the springs $R^4$ to discharge a threaded bolt and must be returned to their normal position for the next operation. The return of the arms or jaws is by means of a cam-ring $T^2$, having an inclined upper face and having on its periphery a series of cam-faces $t^3$ to engage with the ends $r^3$ of the arms or jaws and hold the die closed for cutting the thread. The cam-ring is mounted on a vertically-movable collar or ring T, having a rim $t$ around which the cam-ring is located. The ring or support T is encircled by a band $T'$, which is held in place by an annular nut $t^2$, screw-threaded onto the end of the collar or ring T, and the band $T'$ has projecting pins or lugs $t'$, which enter the slots $o^8$ of the fork $O^5$ of the arm or lever $O^4$, so that with the rocking of the shaft $O^3$ the arm or lever $O^4$ will be raised and lowered, raising and lowering the collar or ring T and with it the cam-ring $T^2$. The raising or upward movement of the cam-ring occurs after the arms or jaws have been thrown open to discharge a threaded bolt, and with such upward movement the ends $r^3$ of the arms or jaws are forced outward by the inclined upper face of the cam-ring, forcing the upper ends of the arms or jaws inward and closing the threading die or cutter, and with the descent of the arm or lever $O^4$ the cam-ring is carried down, releasing the ends $r^3$ from the cam edges $t^3$ and permitting the springs $R^4$ to act to throw the jaws open. The upward throw of the arm or lever $O^4$ is had with the engagement of the cam $n^3$ and the roller $o^3$, which forces the arm O outward, raising the arm or lever $O^4$ and with it the cam-ring, and such movement will continue until the cam $n^3$ passes the roller $o^3$, at which time the cam-ring $T^2$ has been raised to the limit of its upward movement and the ends $r^3$ of the arms or jaws $R^2$ are engaged with the cam edges $t^3$, holding the arms or jaws closed.

The arm or lever $O^4$ will be held in its raised position by the engagement of the arm or support $O^6$ with the retainer or plate $o^{10}$, which engagement is had by the upward movement of the arm or support $O^6$ from the upward movement of the arm or lever $O^4$, and with the engagement of the arm or support $O^6$ the arms or jaws of the chuck or die will be held closed during the operation of threading a bolt. The closing of the arms or jaws of the clutch or die occurs just before the descent of the plunger $K^2$ to force a pointed or end-rounded bolt-blank through the stops $k^5$ and $k^6$ into the threading die or cutter, and the jaws or arms will be held closed until the thread is finished, at which time the head of the bolt has reached the stops in the head $K^5$, and a further advance of the plunger $K^2$ causes the bolt-head to force the stem $k^6$ outward, engaging the contact-head $O^7$ and forcing the arm or support $O^6$ from the retainer or plate $o^{10}$, releasing the arm or lever $O^4$ for the weight of the parts carried thereby to drop the arm or lever, disengaging the cam-ring from the ends of the arms or jaws of the threading clutch or head, and permitting the arms or jaws to be opened by the action of the springs, and at the same time the spring $O^8$ acts to insure the return of the roller $o^3$ into engagement with the periphery or arm of the disk $N'$ to be acted on by the cam $n^3$ to again return the parts to their normal position and close the arms or jaws of the threading chuck or head.

The operation of threading the bolt will be understood from the foregoing description. The bolt-blanks after being pointed or rounded at the end are entered into the feeding slot or passage $k$, as already described, and the advance blank is forced from the slot or passage by the succeeding blanks and drops down in the opening or passage of the stem or support $K$ and is forced through the stops of the head $K^5$ into the die or cutter, and pressure to initially cut the thread is furnished by the plunger $K^2$ through the action of the friction-disk $M'$ and power-disk $M^3$, as already described. The jaws or arms of the thread-cutting chuck or head are held closed by the operation of the cam-ring until the thread is finished, at which time the head of the bolt forces the sliding stem $k^6$ outward to release the arm or support $O^6$, by which the carrying arm or lever of the cam-ring is held up, permitting the arm or lever to drop for the springs $R^4$ to open the arms or jaws, as already described. The dog or catch $N^2$ will be held out of engagement during the operation of cutting the bolt by the stop-arm $O^2$, which is engaged therewith, as shown in Fig. 1, and with the release of the arm or support $O^6$ and the dropping of the arm or lever $O^4$ thereby the stop-arm $O^2$ will be raised, releasing the dog or catch $N^2$ for the spring $n^4$ to act and throw the pin or stud $n'$ into engagement with a recess or opening $n$ for the disk or wheel $N$ to revolve the cam-disk $N'$, engaging the cam $n^3$ with the roller $o^3$, and raising the arm or lever $O^4$ and the parts connected therewith to close the arms or jaws of the thread-cutting chuck or head and hold the parts in position for the operation of threading the next bolt. The return of the parts to their normal position brings the stop-arm $O^2$ into position to be engaged by the end of the dog or catch $N^2$, releasing the dog or catch from engagement with the disk or wheel $N$ and stopping the rotation of the cam-disk $N'$, which remains stopped until the next bolt is threaded and released. The parts are so timed that during the threading operation the plunger $K^2$ will return to normal position for a new bolt-blank to descend, and with the dropping of the new blank and its engagement by the next descent of the plunger $K^2$ the arms or jaws of the thread-cutting chuck or head will have been opened to discharge the threaded bolt, the stop-arm $O^2$ will have been disengaged from the catch or dog $N^2$, the arms or jaws of the thread-cutting clutch-wheel will have been closed, and the parts will have been returned to the position for the operation of threading the new bolt as the blank therefor is forced through the stops of the head $K^5$ to enter the threading die or cutter with the further descent of the plunger. These operations will continue so long as a pointed or end-rounded bolt-blank is dropped into position to be threaded.

The dies or cutters R should be adjusted accurately in relation to each other and to correspond with the diameter of the bolt to be threaded, and for this purpose each head $R'$ is provided with a scale $r^9$ and each die or cutter is provided with a gage-line $r^8$, as shown in Fig. 21, by means of which and the scale each die or cutter R can be positively and accurately adjusted. The arms or jaws of the thread-cutting chuck or head in case of wear and to properly adjust their closing should be accurately moved by the cam-ring in order to secure perfect and uniform threading and have the threading operation performed accurately on bolt-stems of different diameters. This adjustment is secured by providing a scale $t^5$ on the rim of the cam-ring $T^2$ and a gage-line $t^6$ on the face of the head collar or ring T, as shown in Fig. 22, so that by moving or turning the cam-ring to the proper scale-mark a correct adjustment of the cam-ring for the cam $t^3$ to operate in conjunction with the ends $r^3$ will be secured, and when adjusted the cam-ring can be permanently locked by a set-screw $t^4$, the set-screw being loosened to permit the adjustment of the cam-ring.

The threading die or cutter is to be supplied with oil, and in order to prevent oil from being thrown out centrifugally by the rotation of the chuck or head, and thereby wasted, the chuck or head is inclosed within a casing V, made in two halves or sections, and when in place locked together by ears $v$ and a suitable retaining-pin. The lower end of the casing sets in a saucer or support V', having a rim and shoulder $v'$ to receive the lower end of the casing, as shown in Fig. 5, and the upper end of the casing has a rim or flange $v^2$ surrounding the lower end of the support or stem K and the head $K^3$, as shown in Fig. 1.

The bolt-blanks are fed into the revolving hopper from the feeding-spout $E^3$ when the machine is in operation. The bolt-blanks $w$ are caught on the upward movement of the slide or plunger F, with the head of a blank resting on the inclined end of the plunger and the stem of the blank in the slot or opening $f$. The limit of upward movement of the slide or plunger brings the inclined end of the slide or plunger F in alinement with the inclined slideway or guideway G', so that the blank will pass from the inclined end of the slide or plunger and enter the slot or opening $g$ and pass therefrom onto the slideway or guideway G' to pass down in the slot or passage $g'$ beneath the cap $g^3$ and into the slot or opening $g^2$, as shown in Figs. 2 and 3. The forward or first bolt-blank is forced into the slot or opening of the feeding-plunger H by the pressure of the succeeding blanks as the blanks are fed along, and the caught bolt-blank is carried down by the plunger and end rounded or pointed in the chuck or head P'. The end rounded or pointed blank is raised by the feeding-plunger into position to be forced therefrom by the action of the ejector or discharger I, which forces the end rounded or pointed blank into the horizontal slot or passage $k$. The end-rounded horizontal blanks are forced forward in the slot or passage $k$ by the succeeding blanks until the front or first blank has reached a point beneath the spring $k^8$ for the forcing of the next blank from the plunger H into the slot or passage $k$ to discharge the front or first bolt-blank from beneath the spring to descend by gravity in the opening or passage K' below the feed-plunger $K^2$. The descended bolt-blank is engaged by the feed-plunger $K^2$ as the plunger descends and forced into the thread-cutting chuck or head, where it is threaded, and afterward released to descend through the hollow shaft completely threaded. The operation of pointing and threading is performed as already described, and it will thus be seen that after the bolt-blanks have been delivered into the revolving hopper the entire operation of feeding the blanks from the hopper, pointing or end-rounding them, and threading and discharging the bolts is automatically performed. It will further be seen that the operation of the parts is so timed as to have the operation of pointing or end-rounding a blank and the operation of threading a pointed or end-rounded blank take place coincidently or at the same time and that the feeding of the blanks successively forward discharges one blank and feeds another into position to be operated upon.

The pointing or end-rounding chuck or head and the threading chuck or head are both revolved continuously, and the operation of the coacting parts is such as to intermittently move the plunger for feeding a blank to the pointing or end-rounding chuck or head at the proper time and to feed a pointed and rounded blank to the thread-cutting chuck or head at the proper time, such intermittent action being had from the controlling devices in the manner already described.

While I have described the construction and operation of my improved bolt-threading machine with considerable minuteness and details of construction, I do not mean thereby to confine myself to forms, details, or operations further than as I may specify or call for them in the several claims, as I contemplate the use of equivalent devices and the making of mechanical changes as circumstances may render advisable or expedient without departing from the prominent features of my invention.

I claim—

1. In a bolt-threading machine, the combination of a revoluble hopper receiving thereinto the bolt-blanks and made in two halves or sections, each with a tapered or inclined end wall, and having a central space or opening between the halves or sections, and a vertically-reciprocating slide or plunger projecting into the hopper through the space or opening between the halves or sections to engage with, raise, and discharge the blanks from the hopper, substantially as described.

2. In a bolt-threading machine, the combination of a revoluble hopper receiving thereinto the bolt-blanks and made in two halves or sections, each with a tapered or inclined end wall, and having a central space or opening between the halves or sections, and a vertically-reciprocating slide or plunger having an acting end provided with an inclined face and a vertical slot or opening, and projected into the hopper through the space or opening between the halves or sections, to engage with, raise, and discharge the blanks from the hopper, substantially as described.

3. In a bolt-threading machine, the combination of a revoluble hopper receiving thereinto the bolt-blanks, and made in two halves or sections, each with a tapered or inclined end wall, and having a central space or opening between the halves or sections, a guard underneath the hopper closing the space or opening between the halves or sections of the hopper on one side, and a vertically-reciprocating slide or plunger having an acting end provided with an inclined face and a vertical slot or opening, and projected into the hopper through the space or opening between the halves or sections to engage with, raise, and discharge the blanks from the hopper, substantially as described.

4. In a bolt-threading machine, the combination of a revolving shaft, a hopper mounted on the shaft and revolving therewith and receiving thereinto the bolt-blanks and made in two halves or sections, each with a tapered or inclined end wall and having a central space or opening between the halves or sections, a guard underneath the hopper closing the space or opening between the halves or sections of the hopper on the outer side, and a vertically-reciprocating slide or plunger having an acting end provided with an inclined face and a vertical slide or opening and projected into the hopper through the space or opening between the halves or sections to engage with, raise, and discharge the blanks from the hopper, substantially as described.

5. In a bolt-threading machine, the combination of a revolving shaft, a hopper mounted on the shaft and revolving therewith for receiving the bolt-blanks thereinto and made in two halves or sections, each with a tapered or inclined end wall, and having a central space or opening between the halves or sections, a fixed spout for discharging the bolt-blanks into the hopper, a fixed guard underneath the hopper on one side, closing the space or opening between the two halves or sections of the hopper on the under side, and a vertically-reciprocating slide or plunger having an acting end provided with an inclined face and a vertical slot or opening and projected into the hopper through the space or opening between the halves or sections to engage with, raise, and discharge the bolt-blanks from the hopper, substantially as described.

6. In a bolt-threading machine, the combination of a revoluble hopper receiving thereinto the bolt-blanks and made in two halves or sections, each with a tapered or inclined end wall, and having a central space or opening between the halves or sections, a vertically-reciprocating slide or plunger having an acting end provided with an inclined face a vertical slot or opening and projected into the hopper through the space or opening between the halves or sections to engage with, raise, and discharge the blanks from the hopper, and a receiving slot or opening into which the blanks pass from the inclined end and slot of the slide or plunger, substantially as described.

7. In a bolt-threading machine, the combination of a revoluble hopper receiving thereinto the bolt-blanks and made in two halves or sections, each with a tapered or inclined end wall, and having a central space or opening between the halves or sections, a vertically-reciprocating slide or plunger having an acting end provided with an inclined face and a vertical slot or opening and projected into the hopper through the space or opening between the halves or sections to engage with, raise, and discharge the blanks from the hopper, a receiving slot or opening into which the blanks pass from the delivery end of the slide or plunger, and an inclined slideway or guideway leading from the receiving slot or opening and having a feeding slot or passage for the bolt-blanks, substantially as described.

8. In a bolt-threading machine, the combination of a slot or opening into which the bolt-blanks are received from the hopper, an inclined slideway or guideway leading from the receiving slot or opening and having a feeding slot or opening for the passage of the bolt-blanks, and a vertical post or standard at the delivery end of the inclined slideway or guideway having a horizontal face on its upper end forming a rest for a bolt-blank head and provided with a vertical delivery slot or passage in line with the rest open on the delivery side and communicating with the feeding slot or opening of the inclined slideway or guideway and into which the bolt-blanks successively pass and are each held vertically suspended on the rest and from which the bolt-blanks are successively discharged in a horizontal plane on the open side of the vertical slot or passage and entered directly into the receiving end of a vertically-operating plunger for the head of the blank to be caught and held in the end, thereby holding the blank vertically suspended from and by the plunger itself, substantially as described.

9. In a bolt-threading machine, the combination of a slideway or guideway having a downward inclination from its receiving end to its delivery end and having a feeding slot or opening therein for the passage of bolt-blanks, a vertical post or standard at the delivery end of the inclined slideway or guideway having a horizontal face on its upper end forming a rest for a bolt-blank head and provided with a vertical delivery slot or passage in line with the rest open on the delivery side and into which the bolt-blanks successively pass and are each held vertically suspended on the rest and from which the bolt-blanks are successively discharged in a horizontal plane on the open side of the slot or passage to be caught and held by a vertically-operating plunger, and a vertically-reciprocating feeding-plunger operating adjacent to the open side of the delivery slot or passage and having in its lower end a slot or opening formed of a horizontal portion receiving and supporting the head and a vertical portion receiving the stem of a bolt-blank, entered into the slot direct from the delivery slot or passage and suspending the blank vertically from the horizontal portion of the slot or opening, substantially as described.

10. In a bolt-threading machine, the combination of a slideway or guideway having a downward inclination from its receiving end to its delivery end and having a feeding slot or opening therein for the passage of bolt-blanks, a vertical post or standard at the delivery end of the inclined slideway or guideway having a horizontal face on its upper end forming a rest for a bolt-blank head and provided with a vertical delivery slot or passage in line with the rest open on the delivery side and into which the bolt-blanks successively pass and are each held vertically suspended on the rest and from which the bolt-blanks are successively discharged in a horizontal plane on the open side of the slot or passage to be caught and held by a vertically-operating plunger, a vertically-reciprocating feeding-plunger operating adjacent to the open side of the delivery slot or passage and having in its lower end a slot or opening formed of a horizontal portion receiving and supporting the head and a vertical portion receiving the stem of a bolt-blank, entered into the slot direct from the delivery slot or passage and suspending the blank vertically from the horizontal portion of the slot or opening, and means for forcing the plunger down carrying with it the caught bolt-blank, substantially as described.

11. In a bolt-threading machine, the combination of a vertically-reciprocating feeding-plunger having in the lower end thereof a T-shaped slot or opening the horizontal portion of which receives and supports a bolt-blank head entered thereinto and the vertical portion of which receives the stem of the bolt-blanks adjacent to the head thereby suspending the blank vertically from and by the plunger direct, means for forcing the plunger down carrying with it the caught bolt-blank held in a vertical suspended position and against upward end movement by the engagement of the head in the receiving-slot therefor, and a pointing or end-rounding chuck or die into which the end of the bolt-blank is forced by the plunger for pointing and rounding, substantially as described.

12. In a bolt-threading machine, the combination of a vertically-reciprocating feeding-plunger having in the lower end thereof a T-shaped slot or opening the horizontal portion of which receives and supports a bolt-blank head entered thereinto and the vertical portion of which receives the stem of the bolt-blank adjacent to the head, thereby suspending the blank vertically from and by the plunger direct, means for forcing the plunger down carrying with it the caught bolt-blank held in a vertical suspended position and against upward end movement by the engagement of the head in the receiving-slot therefor, and a revolving die or cutter into which the blank is carried by the reciprocating plunger to be pointed and end-rounded, substantially as described.

13. In a bolt-threading machine, the combination of a vertically-reciprocating feed-plunger having at its lower end a slot or opening to receive and suspend a bolt-blank, a sliding contact rod or stem carried by the plunger and having a head to engage the head of the blank and hold the blank vertically straight, a head at the upper end of the sliding rod or stem, a coiled spring between the head and the end of the plunger, and a movable contact engaging the head of the upper end of the sliding rod or stem and forcing the plunger down, substantially as described.

14. In a bolt-threading machine, the combination of a vertically-reciprocating feed-plunger having in its lower end a slot or opening to receive and suspend a bolt-blank, a sliding contact rod or stem carried by the plunger and having a head to engage with the head of the bolt-blank, a head on the upper end of the rod or stem, a coiled spring around the rod or stem between the head and the end of the plunger, and a vertically-movable contact rod or stem having a head to engage the head of the plunger rod or stem, substantially as described.

15. In a bolt-threading machine, the combination of a vertically-reciprocating feed-plunger having at its lower end a slot or opening to receive and suspend a bolt-blank, a sliding rod or stem carried by the plunger and having a head to engage with the head of the bolt-blank, a head on the upper end of the rod or stem, a coiled spring around the rod or stem between the upper head and the end of the plunger, a vertically-movable rod or stem having a head to engage the head of the plunger rod or stem, a guide or support carrying the vertically-movable rod or stem, a reciprocating arm carrying the guide or support, and a coiled spring around the rod or stem between its head and the end of the reciprocating arm, substantially as described.

16. In a bolt-threading machine, the combination of a vertically-reciprocating feed-plunger having in its lower end a slot or opening for receiving and suspending a bolt-blank, and a reciprocating ejector or discharger having an acting end to enter the slot or opening of the plunger and force the bolt-blank therefrom, substantially as described.

17. In a bolt-threading machine, the combination of a vertically-reciprocating feed-plunger having in its lower end a slot or opening for receiving and suspending a bolt-blank, a reciprocating ejector or discharger having an acting end to enter the slot or opening of the plunger and force the bolt-blank therefrom, an arm or lever reciprocating the ejector or discharger, and a rock-shaft for operating the arm or lever, substantially as described.

18. In a bolt-threading machine, the combination of a vertically-reciprocating feed-plunger having in its lower end a slot or opening for receiving and suspending a bolt-blank, a reciprocating ejector or discharger having an acting end to enter the slot or opening of the plunger and force the bolt-blank therefrom, an arm or lever reciprocating the ejector or discharger, a rock-shaft for operating the arm or lever, an arm on the rock-shaft, and a reciprocating contact engaging the rock-shaft arm, substantially as described.

19. In a bolt-threading machine, the combination of a vertically-reciprocating feed-plunger having in its lower end a slot or opening for receiving and suspending a bolt-blank, a reciprocating ejector or discharger having an acting end to enter the slot or opening of the plunger and force the bolt-blank therefrom, an arm or lever reciprocating the ejector or discharger, a rock-shaft for operating the arm or lever, an arm on the rock-shaft, and an adjustable reciprocating contact engaging the rock-shaft, substantially as described.

20. In a bolt-threading machine, the combination of a vertically-reciprocating feed-plunger having in its lower end a slot or opening for receiving and suspending a bolt-blank, a reciprocating ejector or discharger having an acting end to enter the slot or opening of the plunger and force the bolt-blank therefrom, an arm or lever reciprocating the ejector or discharger, a rock-shaft for operating the arm or lever, an arm on the rock-shaft, an adjustable reciprocating contact engaging the rock-shaft arm, an arm or support carrying the contact, and a reciprocating pitman having the rod or support attached thereto, substantially as described.

21. In a bolt-threading machine, the combination of a vertically-reciprocating feed-plunger having in its lower end a slot or opening for receiving a bolt-blank, a horizontally-reciprocating ejector or discharger having an acting end to enter the slot or opening in the plunger and force the bolt-blank therefrom, and a stop for limiting the upward movement of the plunger at a point for its slot or opening to aline with the acting end of the ejector or discharger, substantially as described.

22. In a bolt-threading machine, the combination of a vertically-reciprocating feed-plunger having in its lower end a slot or opening for receiving and suspending a bolt-blank, a horizontally-reciprocating ejector or discharger having an acting end to enter the slot or opening of the plunger and force the bolt-blank therefrom, and a swinging arm carrying a stop for engaging the plunger and stopping its upward movement at a point for its slot or opening to aline with the acting end of the ejector or discharger, substantially as described.

23. In a bolt-threading machine, the combination of a vertically-reciprocating feed-plunger having in its lower end a slot or opening for receiving and suspending a bolt-blank, a horizontally-reciprocating ejector or discharger having an acting end to enter the slot or opening of the plunger and force the bolt-blank therefrom, a swinging arm, a pin on the swinging arm, and a notch or recess in the body of the plunger for stopping the upward movement at a point for the slot or opening in the plunger to aline with the acting end of the ejector or discharger, substantially as described.

24. In a bolt-threading machine, the combination of a vertically-reciprocating feed-plunger having in its lower end a slot or opening for receiving and suspending a bolt-blank, a horizontally-reciprocating ejector or discharger having an acting end to enter the slot or opening of the plunger and force the bolt-blank therefrom, a swinging arm, a pin on the swinging arm, a notch or recess in the body of the plunger engaged by the pin, a spring engaging the pin with the notch or recess, and a release-arm on the reciprocating ejector or discharger engaging the swinging arm and carrying the pin out of the slot, for stopping the upward movement of the plunger and releasing the plunger after the stoppage, substantially as described.

25. In a bolt-threading machine, the combination of a vertically-reciprocating feed-plunger having in its lower end a slot or opening for receiving and suspending a bolt-blank, a horizontally-reciprocating ejector or discharger having an acting end to enter the slot or opening of the plunger and force the bolt-blank therefrom, a swinging arm, a pin on the swinging arm, a notch or recess in the body of the plunger engaged by the pin, a spring for engaging the pin with the notch, a release-arm on the reciprocating ejector or discharger engaging the swinging arm and carrying the pin out of the notch or recess, and a spring engaging the feed-plunger after its release and returning the same to its normal position to receive a new bolt-blank, substantially as described.

26. In a bolt-threading machine, the combination of a revoluble hopper receiving thereinto the bolt-blanks and made in two halves or sections, each with a tapered or inclined end wall, and having a central space or opening between the halves or sections, a vertically-reciprocating slide or plunger projected into the hopper through the space or opening between the halves or sections to engage with, raise, and discharge the bolt-blanks from the hopper, a feedway or passage receiving the bolt-blanks from the slide or plunger, a vertically-reciprocating feed-plunger receiving a bolt-blank from the feedway or passage and holding the blank suspended, a pointing or rounding die into which the blanks are fed by the plunger for pointing or rounding the end, and a horizontally-reciprocating ejector or discharger for forcing the blank after having its end pointed or rounded, out from the feed-plunger, substantially as described.

27. In a bolt-threading machine, the combination of a vertically-reciprocating feed-plunger receiving and suspending a bolt-blank for pointing and rounding the end of the blank, a horizontal ejector or discharger forcing the pointed or end-rounded blank from the feed-plunger, and a horizontal feed slot or passage receiving the pointed or end-rounded bolt-blanks from the feed-plunger, substantially as described.

28. In a bolt-threading machine, the combination of a vertically-reciprocating plunger, a stationary horizontal feed slot or passage, receiving pointed or end-rounded bolt-blanks from the vertically-reciprocating plunger and supporting the blanks endwise vertically suspended side by side from their heads to travel horizontally forward, a retainer at the discharge end of the horizontal feed-slot or passage engaging the leading bolt-blank, and a vertical slot or passage into which the discharge end of the horizontal feed slot or passage opens for the successive blanks, as each one passes the retainer, to drop down in the vertical slot or passage for threading the ends, substantially as described.

29. In a bolt-threading machine, the combination of a vertically-reciprocating plunger, a stationary horizontal feed slot or passage, receiving pointed or end-rounded bolt-blanks from the vertically-reciprocating feed-plunger and supporting the blanks endwise vertically suspended, side by side, from their heads to travel horizontally forward, a vertical slot or passage into which the discharge end of the horizontal feed slot or passage opens for the successive blanks, as each one passes the end of the horizontal feed slot or passage, to drop down in the vertical slot or passage, and a retainer at the lower end of the vertical slot or passage preventing the natural descent of the dropped blank beyond the point of retention, substantially as described.

30. In a bolt-threading machine, the combination of a vertically-reciprocating feed-plunger receiving and suspending a bolt-blank, a die or cutter into which the blank is fed for pointing or rounding the end, a horizontally-reciprocating ejector or discharger forcing the blank from the feed-plunger, a horizontal feed slot or passage receiving the end pointed or rounded blanks from the feed-plunger, a vertical opening or passage into which the end pointed or rounded blanks are discharged from the horizontal feed slot or passage, a retainer at the end of the vertical opening or passage for stopping the descent of the blanks, a vertically-reciprocating plunger operating in the opening or passage and engaging the head of a blank and forcing the blank through the retainer, and a threading die or cutter into which the blank is fed by the plunger for end pointing or rounding and for threading bolt-blanks, substantially as described.

31. In a bolt-threading machine, the combination of a feedway or passage receiving and feeding bolt-blanks from a hopper, a vertically-reciprocating feed-plunger receiving and suspending bolt-blanks from the feedway or passage, a die or cutter into which a blank is fed for pointing or rounding the end, a horizontally-reciprocating ejector or discharger forcing the blank from the plunger, a horizontal feed slot or passage receiving the end pointed or rounded blanks from the feed-plunger, a vertical opening or passage into which the end pointed or rounded blanks are discharged from the horizontal feed slot or passage, a retainer at the end of the vertical opening or passage for stopping the descent of the blanks, a vertically-reciprocating plunger operating in the opening or passage and engaging the head of a blank and forcing the blank through the retainer, and a threading die or cutter into which the blank is fed by the plunger, for end pointing or rounding and for threading bolt-blanks, substantially as described.

32. In a bolt-threading machine, the combination of a revoluble hopper receiving thereinto the bolt-blanks and made in two halves or sections, each with a tapered or inclined end or wall, and having a central space or opening between the halves or sections, a vertically-reciprocating slide or plunger projected into the hopper through the space or opening between the halves or sections to engage with, raise and discharge the bolt-blanks from the hopper, a feedway or passage receiving bolt-blanks from the hopper, slide or plunger, a vertically-reciprocating feed-plunger receiving and suspending the bolt-blanks from the feedway or passage, a die or cutter into which a blank is fed for pointing or rounding the end, a horizontally-reciprocating ejector or discharger forcing the blank from the plunger, a horizontal feed slot or passage receiving the end pointed or rounded blanks from the feed-plunger, a vertical opening or passage into which the end pointed or rounded blanks are discharged from the horizontal feed slot or passage, a retainer at the end of the vertical opening or passage for stopping the descent of the blanks, a vertically-reciprocating plunger operating in the opening or passage and engaging the head of a blank and forcing the blank through the retainer, and a threading die or cutter into which the blank is fed by the plunger, for end pointing or rounding and for threading bolt-blanks, substantially as described.

33. In a bolt-threading machine, the combination of a vertically-reciprocating plunger operating to feed a bolt-blank into a threading die or cutter, a lever for operating the plunger, and means for giving the plunger a retarded movement from the lever as the bolt-blank enters the threading die or cutter, substantially as described.

34. In a bolt-threading machine, the combination of a vertically-reciprocating plunger operating to feed a bolt-blank into a threading die or cutter, a lever for operating the plunger, links pivotally connected with the arm or lever, a rock-shaft for the links, a pitman or rod for rocking the shaft, and a friction-disk for operating the pitman or rod to give the plunger a retarded movement from the lever as the bolt-blanks enter the threading die or cutter, substantially as described.

35. In a bolt-threading machine, the combination of a chuck or head carrying a threading die or cutter and having pivoted arms or jaws, each arm or jaw having a contact end, a vertically-movable cam-ring having an upper inclined face and cams on its edge or periphery engaging the contact ends of the arms or jaws, a rocking arm or lever carrying the ring for the upward movement of the ring to close and have the cam edge act and hold closed the arms or jaws, a pivoted arm or support for the rocking arm or lever, and means for disengaging the pivoted arm or support to allow the arm or lever to drop or fall and release the closing and retaining cam-ring for the arms or jaws to open, substantially as described.

36. In a bolt-threading machine, the combination of a chuck or head carrying a threading die or cutter and having pivoted arms or jaws, each arm or jaw having a contact end, a vertically-movable cam-ring having an upper inclined face and cams on its edge or periphery engaging the contact ends of the arms or jaws, a rocking arm or lever carrying the cam-ring for the upward movement of the ring to close and have the cam edge act and hold closed the jaws, a pivoted arm or support for the rocking arm or lever, a catch for the pivoted arm or support, and a slide engaging the arm or support and actuated by the head of the threaded bolt passing the end of the slide to release the arm or support from its catch and permit the rocking arm or lever to drop and release the jaws or arms of the chuck or head for the jaws or arms to open and discharge the threaded bolt, substantially as described.

37. In a bolt-threading machine, the combination of a chuck or head carrying a threading die or cutter and having pivoted jaws or arms, each jaw or arm having a contact end, a vertically-movable cam-ring having an inclined face and cams on its periphery or edge for engaging the contact ends of the jaws or arms, a rocking arm or lever carrying the cam-ring, a rock-shaft for the arm or lever, an arm on the rock-shaft, and an intermittently-revolving eccentric or cam disk engaging the rock-shaft arm, for intermittently rocking the shaft and raising the cam-ring to close and hold closed the jaws or arms of the chuck or head, substantially as described.

38. In a bolt-threading machine, the combination of a chuck or head carrying a threading die or cutter and having pivoted jaws or arms, each jaw or arm having a contact end, a vertically-movable cam-ring having an inclined face and cams on its periphery or edge for engaging the contact ends of the jaws or arms, a rocking arm or lever carrying the cam-ring, a rock-shaft for the arm or lever, an arm on the rock-shaft, an intermittently-revolving eccentric or cam disk engaging the rock-shaft arm, a continuously-revolving disk or wheel having notches or recesses in its periphery, and a dog or catch mounted on the eccentric or cam disk and engaging the eccentric or cam disk with the revolving disk or wheel imparting rotation to the eccentric or cam disk for rocking the shaft and raising the cam-ring to close and hold closed the jaws or arms of the chuck or head, substantially as described.

39. In a bolt-threading machine, the combination of a chuck or head carrying a threading die or cutter and having pivoted jaws or arms, each jaw or arm having a contact end, a vertically-movable cam-ring having an inclined face and cams on its periphery or edge for engaging the contact ends of the jaws or arms, a rocking arm or lever carrying the cam-ring, a rock-shaft for the arm or lever, an arm on the rock-shaft, an intermittently-revolving eccentric or cam disk engaging the rock-shaft arm, a continuously-revolving disk or wheel having notches or recesses in its periphery, a dog or catch mounted on the eccentric or cam disk and engaging the eccentric or cam disk and the revolving disk or wheel imparting rotation to the eccentric or cam disk, and a stop-arm projecting from the rock-shaft arm and engaging the disk dog or catch for releasing the eccentric or cam disk from the revolving wheel or disk and stopping the rotation of the eccentric disk, substantially as described.

40. In a bolt-threading machine, the combination of a chuck or head carrying a threading die or cutter and having pivoted jaws or arms, each jaw or arm having a contact end, a vertically-movable cam-ring for closing and holding closed the jaws or arms, a rock arm or lever carrying the cam-ring, a rock-shaft for the arm or lever, an arm on the rock-shaft, an L or bell-crank lever pivotally connected with the rock-shaft arm and having on one member a roller, and an intermittently-revolving disk having a cam thereon engaging the roller for moving the rock-shaft arm and rocking the shaft, substantially as described.

41. In a bolt-threading machine, the combination of a chuck or head carrying a threading die or cutter and having pivoted jaws or arms, each jaw or arm having a contact end, a vertically-movable cam-ring for closing and holding closed the jaws or arms, a rock arm or lever carrying the cam-ring, a rock-shaft for the arm or lever, an arm on the rock-shaft, an L or bell-crank lever pivotally connected with the rock-shaft arm and having on one member a roller, an intermittently-revolving disk having a cam thereon, a continuously-revolving disk or wheel having peripheral notches or recesses, a dog or catch mounted on the cam-disk and engaging with the recess or notches of the continuously-revolving disk or wheel for imparting rotation to the cam-disk to operate the rock-shaft, substantially as described.

42. In a bolt-threading machine, the combination of a chuck or head carrying a threading die or cutter and having pivoted jaws or arms, each jaw or arm having a contact end, a vertically-movable cam-ring for closing and holding closed the jaws or arms, a rock arm or lever carrying the closing-ring, a rock-shaft for the arm or lever, an arm on the rock-shaft, an L or bell-crank lever pivotally connected with the rock-shaft arm and having on one member a roller, an intermittently-revolving disk having a cam thereon, a continuously-revolving disk or wheel having peripheral notches or recesses, a dog or catch mounted on the cam-disk and engaging with the recess or notches of the continuously-revolving disk or wheel for imparting rotation to the cam-disk to operate the rock-shaft arm, a stop-arm engaging with and releasing the dog or catch from the continuously-revolving disk or wheel, and a yielding connection between the stop-arm and the L or bell-crank lever for preventing injury to the parts in case of non-action, substantially as described.

43. In a bolt-threading machine, the combination of a chuck or head carrying a threading die or cutter and having pivoted jaws or arms, each jaw or arm having a contact end, a vertically-movable cam-ring for closing and holding closed the jaws or arms, a rock arm or lever carrying the cam-ring, a rock-shaft for the arm or lever, an arm on the rock-shaft, an L or bell-crank lever pivotally connected with the rock-shaft arm and having on one member a roller an intermittently-revolving disk having a cam thereon, a continuously-revolving disk or wheel having peripheral notches or recesses, a dog or catch mounted on the cam-disk and engaging with the recesses or notches of the continuously-revolving disk or wheel for imparting rotation to the cam-disk to operate the rock-shaft arm, a stop-arm engaging with and releasing the dog or catch from the continuously-revolving disk or wheel, a rod or stem pivoted to one member of the L or bell-crank lever and passing through the stop-arm, a nut on the projected end of the rod or stem, and a coil-spring between the nut and the stop-arm for permitting the L or bell-crank lever to yield and prevent injury in case of non-action of the parts, substantially as described.

GEORGE W. PACKER.

Witnesses:
ARTHUR JOHNSON,
CARL DETZER.